(No Model.) 2 Sheets—Sheet 1.
W. S. SALISBURY.
ELECTRIC MOTOR FOR STREET CARS.
No. 408,753. Patented Aug. 13, 1889.
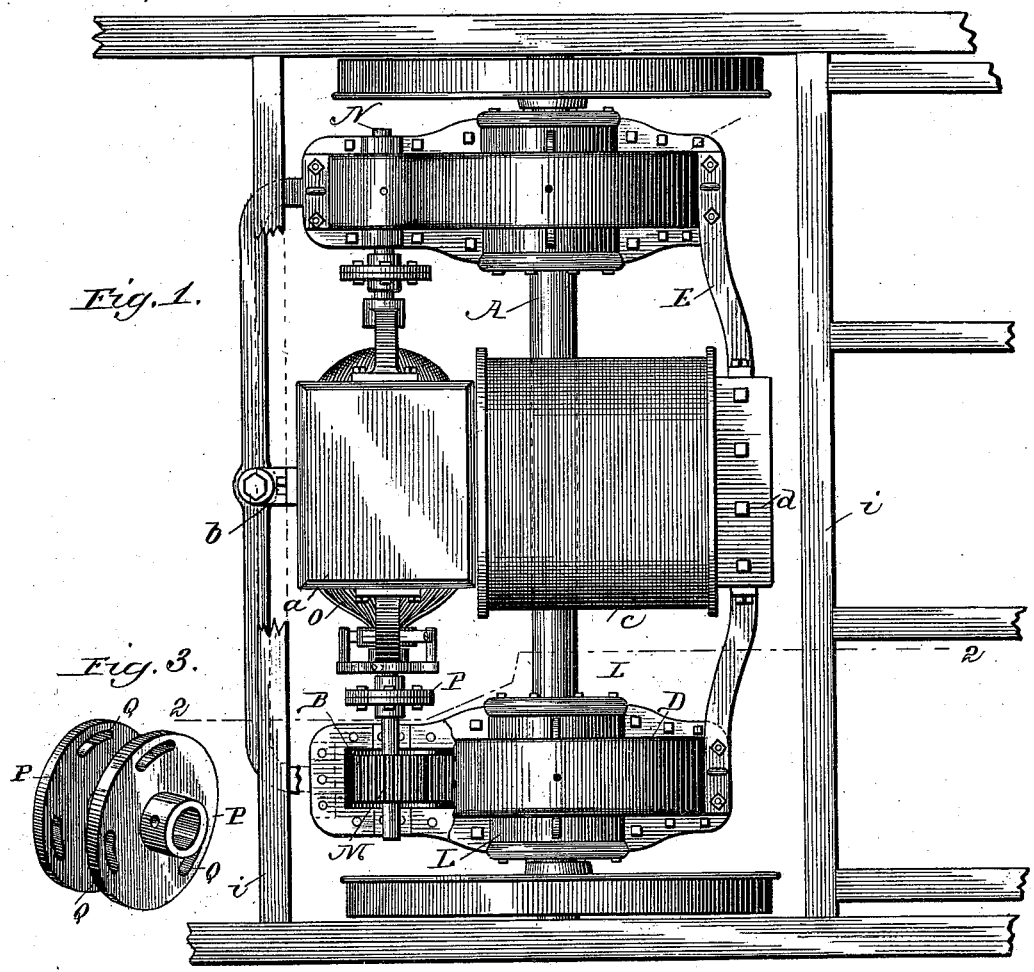
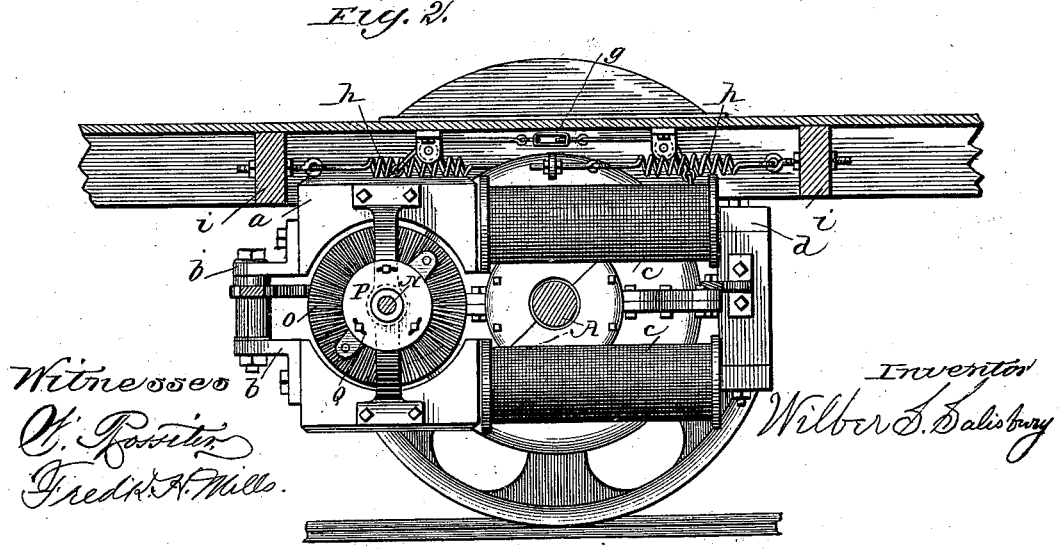

(No Model.) 2 Sheets—Sheet 2.
W. S. SALISBURY.
ELECTRIC MOTOR FOR STREET CARS.
No. 408,753. Patented Aug. 13, 1889.
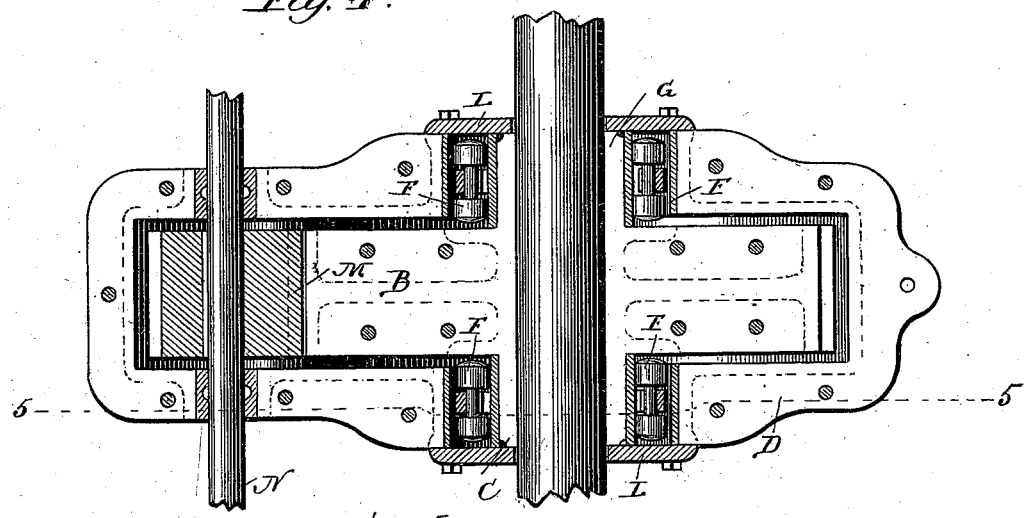
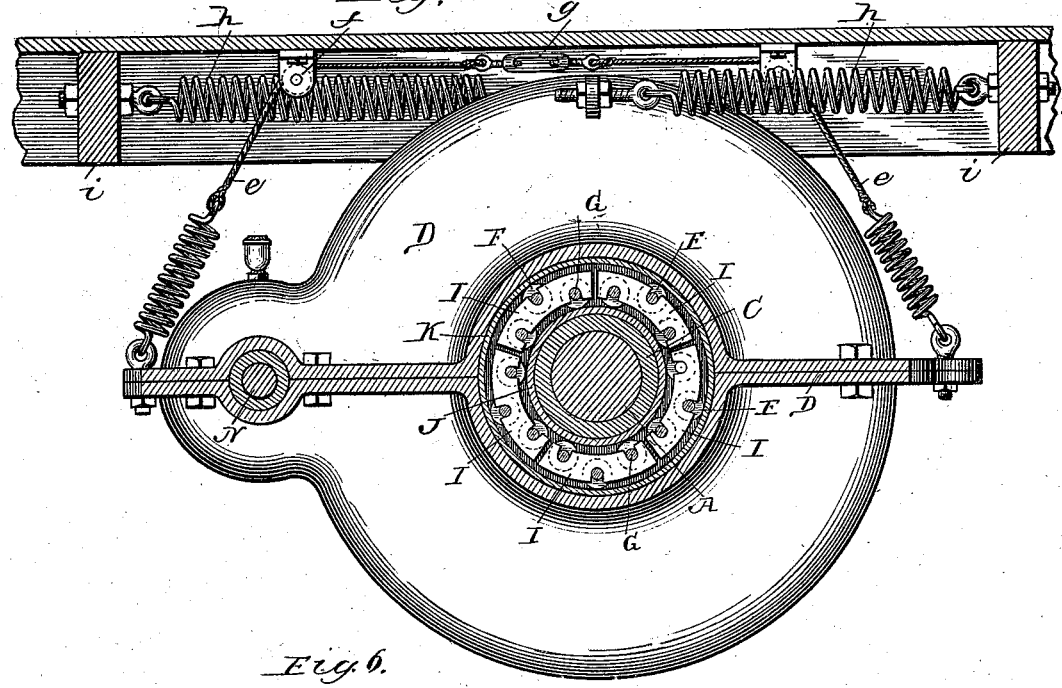
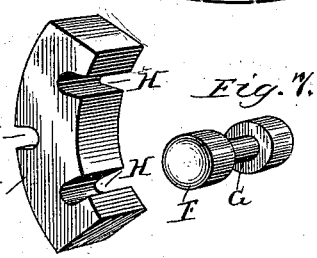
Witnesses
Inventor
Wilber S. Salisbury

UNITED STATES PATENT OFFICE.

WILBER S. SALISBURY, OF CHICAGO, ILLINOIS.

ELECTRIC MOTOR FOR STREET-CARS.

SPECIFICATION forming part of Letters Patent No. 408,753, dated August 13, 1889.

Application filed August 22, 1888. Serial No. 283,323. (No model.)

*To all whom it may concern:*

Be it known that I, WILBER S. SALISBURY, a citizen of the United States, and a resident of Chicago, in the county of Cook and State of Illinois, have invented certain new and useful Improvements in Motors for Street-Cars, of which the following is a specification.

This invention relates to improvements in electric motors for street-cars in which an electromotor is mechanically connected with and operates the car-axle, so as to propel the car, and has for its prime object to so dispose of the component parts of a single motor that they may be substantially balanced upon the car-axle.

Another object is to so arrange the armature and field-magnets of the motor that the weight thereof will be supported near the ends of the axle instead of the middle, as heretofore.

Another object is to have the motor-support so connected with the car-body that the weight thereof may be adjusted and the friction thereof accordingly reduced.

A still further object is to have an antifriction bearing for the motor-support upon the axle of such a character as to offer the minimum resistance and friction to the rotation of the axle.

I attain these objects by the devices illustrated in the accompanying drawings, in which—

Figure 1 represents a plan view of a portion of a car-frame and one of the axles having devices applied thereto embodying my invention; Fig. 2, a vertical section on the line 2 2 of Fig. 1; Fig. 3, a persective view of the adjustable coupling-plates; Fig. 4, a horizontal central section through one of the bearings of the motor-support upon the axle; Fig. 5, a vertical section thereof on the line 5 5 of Fig. 4, and Figs. 6 and 7 detail perspective views of the anti-friction-bearing devices for the casing.

Similar letters of reference indicate the same parts in the several figures of the drawings.

Referring by letter to the accompanying drawings, A indicates the axle, and B gear-wheels mounted thereon near each end thereof, and provided with elongated hubs C, between which and a casing D is an anti-friction bearing consisting of a series of rollers F, having contracted journals G at the center of length thereof, bearing in sockets H, arranged for their reception in the inner and outer peripheries of a ring composed of sections I of any desired number, the said casing constituting a portion of a rectangular frame E for supporting the motor, as hereinafter described. These sections are of just sufficient width to fit within the contracted portion of the rollers, which are thereby prevented from having any endwise movement, and are held separated from each other by the socketing of their journals in the ring-sections. I prefer to arrange these rollers with two of them upon the inner and one upon the outer periphery of each section and bearing upon the hub of the gear-wheel and wall of the casing, respectively, or, if desired, upon bushings J K, interposed between the rollers and their bearings to reduce the wear between these parts. These rollers and the sectional rings dividing them are preferably confined within the hub of the casing by removable caps or plates L, which furnish a ready means of access to the rollers and enable the removal of any section of the ring and its accompanying rollers without disturbing any other portion of the ring or set of rollers, and they also permit of the removal and renewal of any portion of the sectional bushings which may become worn beyond usefulness. There are two of these casings—one near each end of the axle—connected by transverse bars and adapted and arranged to house in, so as to protect from dust and dirt the gear-wheels B, mounted upon the axles, as well as smaller gear-wheels M, meshing with said axle gear-wheels and mounted upon the ends of the armature-shaft N, which finds a bearing in said casings, the armature O being mounted on the shaft between the casings and extending parallel with the axle.

The armature-shaft is preferably composed of a middle and two end sections, the armature being mounted on the middle section and the gears on the end sections, in order that the gearing may be adjusted so as to properly mesh, to which end the sections are united by coupling-plates P, (more clearly shown in Fig. 3,) secured to the opposing ends of the shaft-sections, said plates being provided with registering concentric slots Q, through which work screw-bolts for firmly securing the plates in any adjusted position.

The two poles $a$ of the field-magnet lie one above and one below the armature, and are supported upon one transverse bar of the frame by extensions or brackets B, composed of non-magnetic metal, or may be insulated from the frame by rubber washers or in any other suitable manner.

The spools or wire-wound cores $c$ $c$ of the field-magnet are attached at one end to the pole-pieces $a$ $a$ and lie in a horizontal plane one above and one below the axle A, the yoke or back piece $d$ thereof being attached to, insulated from, and preferably constituting a portion of the other transverse bar of the frame E, so that the weight of the field-magnet and armature is not only substantially balanced, upon the axle, but is equally divided above and below the axle, so as to economize space and utilize all of the available space beneath the car-body without the necessity of elevating the same. By this arrangement I am also enabled to employ several sets of spools in connection with the field-magnet, and thereby materially increase the power of the motor without unbalancing the support of the motor upon the axle or requiring more room beneath the car-body than is now available.

The frame supporting the motor is connected with the body of the car by means of a flexible guy $e$, working over pulleys $f$, attached to the car-body, the guy being attached to the support at its ends on each side of the axle and made adjustable in length by means of a turn-buckle $g$ in the horizontal portion thereof between the pulleys, which device enables the adjustment of the weight of the motor and its support upon the axle, so as to partially relieve the bearings of the support on the axle of its weight and friction by sharing the weight with the car-body.

I also design to employ in connection with this motor when so supported the draft-springs $h$, attached to the casings D at their ends, respectively, extending in opposite directions therefrom, and attached at their opposite ends to suitable cross-timbers $i$ of the car-body for the purpose of relieving the car and motor of the sudden jerk or jar in starting and stopping, which springs were described and claimed in my application for Letters Patent of the United States filed July 5, 1888, Serial No. 279,026, and therefore form no part of this invention.

By the peculiar arrangement of the field-magnet and armature herein shown and described I am enabled to have a single motor substantially balanced upon the car-axle, so as to dispense with the spring-supports heretofore necessary when a single motor has been employed and partially supported upon but to one side of the axle, and I am also enabled to so adjust the weight of the motor-support as to materially relieve the bearing thereof on the axle of the weight of these parts and thereby reduce the friction between the support and the rotating axle to the minimum, to further which end I am enabled to employ an anti-friction bearing for the support.

I claim—

1. In a motor for street-cars, the axle and a frame journaled thereon, in combination with an electric motor supported in said frame, the field-magnet cores of which straddle the axle, and a gear-connection between said motor and axle, substantially as described.

2. In a motor for street-cars, the axle and a metallic frame journaled thereon, in combination with an electric motor supported on said frame, the field-magnet cores of which straddle the axle, a yoke therefor constituting a portion of said frame, and a gear-connection between said motor and axle, substantially as described.

3. In a motor for street-cars, the axle, a metallic frame journaled thereon, and a shaft journaled in said frame, extending parallel with the axle, in combination with an electric-motor armature on said shaft and field-magnet cores attached to said frame astride the axle, extending at a right angle and in the same direction from the armature, and a gear-connection between said shaft and axle, substantially as described.

4. In a motor for street-cars, the axle and a frame journaled thereon, in combination with an electric motor supported in said frame, the armature of which extends parallel with and in the same plane as the axle, and the field-magnet cores of which straddle the axle, and a gear-connection between said motor and axle, substantially as described.

5. In a motor for street-cars, the axle, gears mounted thereon near the ends thereof, and a frame journaled on said axle, in combination with an electric motor supported on said frame, the field-magnet cores of which straddle the axle, and the armature-shaft of which extends parallel with the axle, and gears on said shaft meshing with the gears on the axle, substantially as described.

6. In a motor for street-cars, the axle, gears mounted thereon near the ends thereof, and a frame journaled on the axle, in combination with an electric motor supported upon said frame, the field-magnet cores of which straddle the axle, a shaft journaled in said frame parallel with and in the same plane as the axle upon which the armature of the motor is mounted, and gears on said shaft meshing with the gears upon the axle, substantially as described.

7. In a motor for street-cars, the axle-gears mounted thereon and a frame journaled on said axle, in combination with an electric motor supported on said frame, the field-magnet cores of which straddle the axle, a three-part shaft journaled in said frame, extending parallel with and in the same plane as the axle, the motor-armature mounted on the central portion of said shaft, gears mounted on the end portions of the shaft meshing with the gears on the axle, adjustable coupling-plates for uniting the parts of the shaft, and casings attached to said frame for covering said gears, substantially as described.

8. In a motor for street-cars, the axle, a frame journaled thereon, an electric motor supported on said frame, the armature-shaft of which extends parallel with and to one side of the axle and the field-magnet cores of which straddle the axle from the opposite side thereof, in combination with pulleys attached to the car-body and a flexible guy secured at its ends, respectively, to said frame on each side of the axle and working over said pulleys, substantially as described.

9. In a motor for street-cars, the axle and gears mounted thereon near the ends thereof, provided with elongated hubs, in combination with a frame supporting the electric motor for operating the axle, a ring provided with bearing-sockets on the inner and outer peripheries thereof, and anti-friction rollers having contracted central portions constituting journals therefor and working in said sockets, the inner and outer sets of rollers bearing, respectively, upon the hubs of the gears and bearing-walls of the frame, substantially as described.

10. In a motor for street-cars, the axle, a frame journaled thereon, an electric motor supported on said frame, the armature-shaft of which extends parallel with and to one side of the axle and the field-magnet cores of which straddle the axle from the opposite side thereof, in combination with pulleys attached to the car-body, a flexible guy attached at its ends, respectively, to said frame at each side of the axle and working over said pulleys, and a turn-buckle in said guy between the pulleys, substantially as described.

11. In a motor for street-cars, the axle and gears mounted thereon near the ends thereof, provided with elongated hubs, in combination with a frame for supporting the electric motor operating the axle, a casing mounted thereon having a hub of larger bore than the hub of the gears, a sectional ring working freely between the hubs of the gears and casings, each section of which is provided with bearing-sockets in the inner and outer peripheries thereof, and anti-friction rollers having contracted central portions constituting journals therefor and working in said sockets, the inner and outer sets of rollers bearing, respectively, upon the hubs of the gears and casings, substantially as described.

WILBER S. SALISBURY.

Witnesses:
W. ROSSITER,
FREDK. H. MILLS.